May 17, 1960 W. C. OLIVER 2,937,283

SCANNING DEVICE

Filed Nov. 25, 1957 2 Sheets-Sheet 1

INVENTOR
WILBUR C. OLIVER

BY: John B. Clark

ATTORNEY

SCANNING DEVICE

Filed Nov. 25, 1957 2 Sheets-Sheet 2

United States Patent Office 2,937,283

Patented May 17, 1960

2,937,283

SCANNING DEVICE

Wilbur C. Oliver, Santa Cruz County, Calif., assignor to International Business Machines Corporation, New York, N.Y., a corporation of New York Application November 25, 1957, Serial No. 698,461

7 Claims. (Cl. 250—233)

This invention pertains to a character scanning device, and more particularly to such a device wherein an image of a character to be identified may be scanned along several axes by a single unidirectional motion.

In the character scanning art, it is usually desirable when scanning an unknown character to scan along several axes thereof in order to obtain sufficient information about the character to identify it. However, to provide this scanning along several axes, prior devices have employed complicated and elaborate apparatus using a separate scanning member and motion ot scan each individual image axis. For example, crossed belts with slits therein have been used wherein each belt moves in a different direction over a character to produce its own scan of the projected character image. Such a crossed belt arrangement requires additional moving scanning members and introduces synchronous timing problems since a window in one belt must always be synchronously located over the image as a slit in the other belt is scanning the image. It also requires coordination of several scanning motions to obtain information along the several axes of the image.

Therefore, it is an object of this invention to provide a multiple axis scan of an image using one shutter operating continuously in only one direction.

It is another object of this device to provide a simplified scanning device wherein synchronous timing of shutters is not required.

Briefly stated, this invention comprises a carrier such as a disc, drum or belt operatnig cyclically in one direction. The carrier has slits or apertures disposed therein at various angles to the direction of the carrier's travel. Each of these slits will coincide with only those parts of the character which are parallel thereto when passing thereover. This coincidence of a part of an image with a scanning slit is sensed by a photo responsive tube or suitable element. In this manner the slits can each scan an image along a different axis thereof seeking coincidence with parallel parts of the image scanned without reversing the carrier and without using additional scanning motions. In short, with a shutter operated in a single direction, an image projected thereon is scanned along several axes.

Thus, by merely adding additional slits at any desired angle to the carrier direction of travel, more information about a character can be obtained in order to identify it.

Therefore, it is another object of this invention to provide a scanning device easily and simply adaptable to provide a maximum of information about unidentified characters.

Other objects of the invention will be pointed out in the following description and claims and illustrated in the accompanying drawings which disclose, by way of example, the principle of the invention and the best mode which has been contemplated of applying that principle.

Figures 3, 5, 5A, 6, 7:
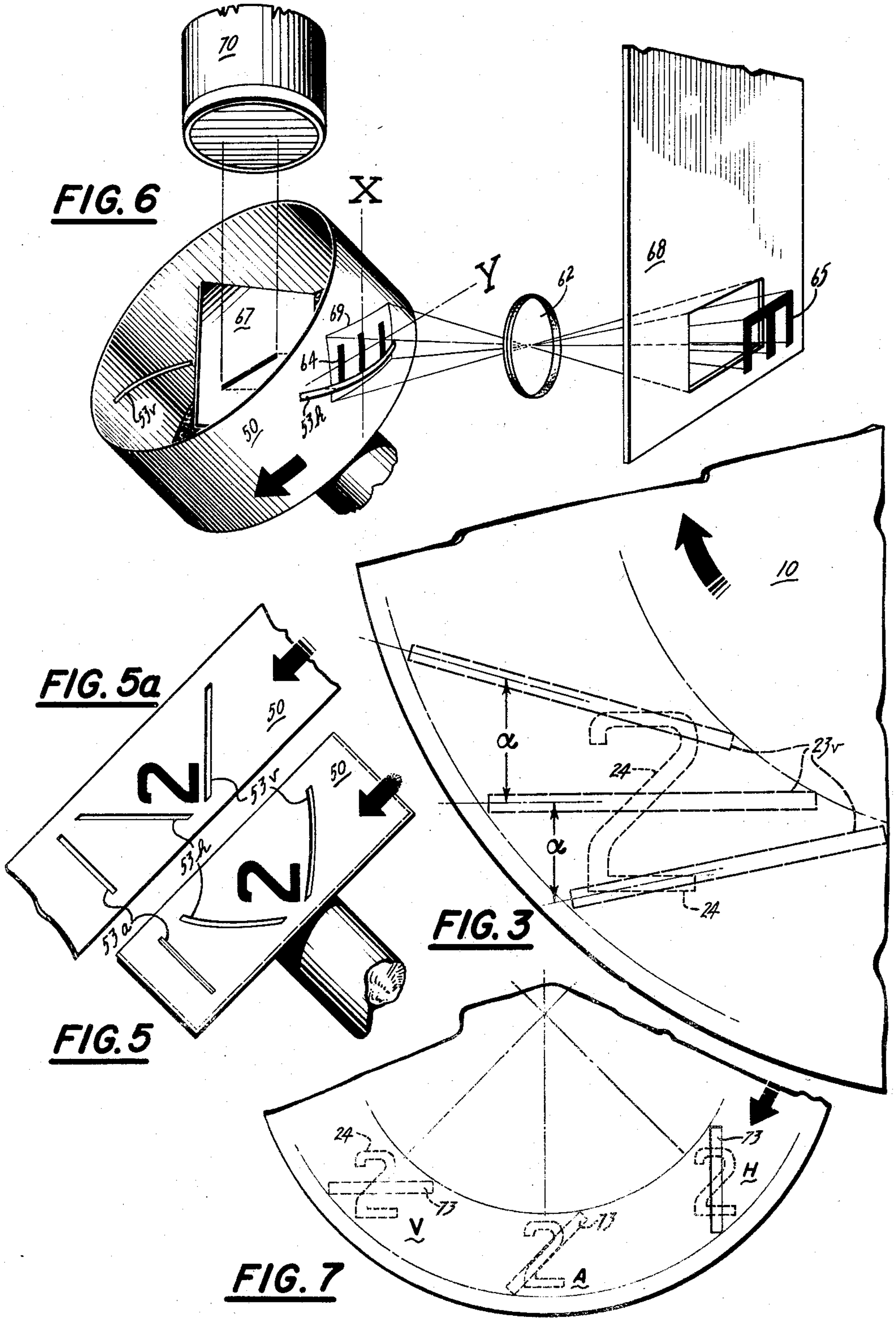
Fig. 3 is an enlarged portion of Fig. 2 demonstrating the skewing of an aperture in the disc of Fig. 1 as it crosses a projected image.
Fig. 5 shows schematically another form of the invention employing a drum.

Fig. 5*a* represents the drum of Fig. 5 as it would appear if it were "unrolled" and laid flat.

Fig. 6 is a diagrammatic representation in perspective of the drum of Fig. 5 showing its association with projecting and sensing means.

Fig. 7 shows how a single aperture can be used to scan several axes of a character.

Figure 1:
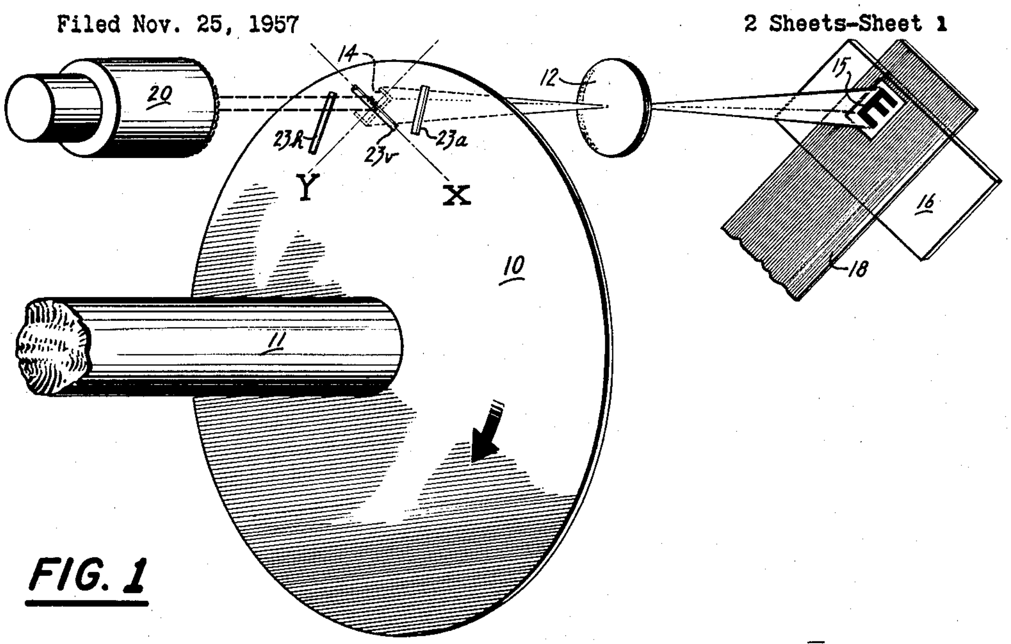
Fig. 1 is a schematic perspective view of one form of the invention employing a disc.
Figures 2, 4:
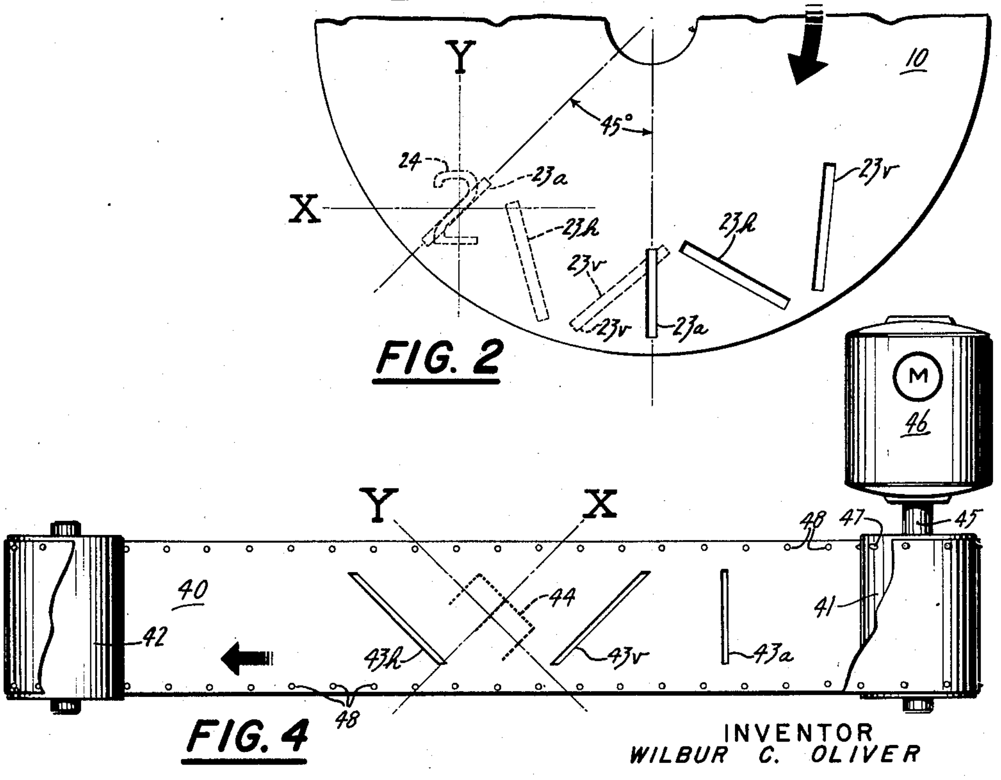
Fig. 2 is an enlarged view of a portion of the disc of Fig. 1 showing the slits therein in two positions as the disc is rotated forty-five degrees.
Fig. 4 is a schematic plan view, in partial section, of another form of the invention employing a belt as the scanning carrier.

Referring to the drawings, and particularly to Figs. 1 and 2, the invention as shown therein is comprised of a disc 10 arranged for rotation about an axis 11. A lens 12 is provided for projecting an image 14 of a printed character 15 (i.e., the "E" in Fig. 1) from a card 16 onto disc 10. In order to project only one character at a time upon disc 10, a mask 18 is placed over card 16.

Along the outer periphery of disc 10 and formed therein are several scanning apertures or slits 23 for scanning along various axes of image 14. For example, in Fig. 1 slit 23*v* will pass upwardly of image 14 as disc 10 is rotated clockwise, thereby providing a vertical scan along the Y axis of image 14. When slit 23*v* crosses the bottom of image 14, the lower horizontal portion of the "E" will be almost parallel with slit 23*v*. Thus, slit 23*v* will coincide roughly with that portion of image 14. This substantial coincidence of a portion of the character's image with slit 23*v* is detected by a photomultiplier tube 20 responsive to changes in conditions of darkness and light impinging thereupon. Thus, for each instance of substantial coincidence, tube 20 generates a signal. In the example, the intermediate and upper horizontal bars of the "E" when scanned vertically will also provide signals via tube 20. Although tube 20, as shown, is located on the opposite side of disc 10 from lens 12, it could be placed on the same side of disc 10 as lens 12, provided elongated mirror surfaces are substituted for slits 23.

Similarly, slit 23*h* scans horizontally across the image seeking coincidence with vertical portions of image 14 while disc 10 continues its clockwise rotation. In the example, when the "E" is scanned horizontally only one signal will be generated via tube 20 since an "E" has only one vertical member to coincide with slit 23*h*.

If additional signals are desried, in order to provide enough identifying data, then slits can be provided which seek coincidence with the angular portions of such characters as "A," "M," "N," etc. or for example, the angular portion of the "2" image 24 as shown projected upon disc 10 from underneath in Fig. 2. Thus, coincidence with angular, as well as with the vertical and horizontal character members as described above, can be obtained by merely providing appropriate slits such as 23*a* in disc 10.

Slit 23*a* happens to be disposed along a radius of disc 10 although any angular disposition suitable for the design of the characters being scanned will obviously be satisfactory. Another feature of this invention is that many styles of printing or type fonts can be scanned by merely substituting a disc designed to accommodate the vertical, horizontal and angular members of the particular style. By employing suitable well known circuitry for interpreting the signals generated from the horizontal, vertical and angular scans, the character is identified.

Referring now to Fig. 3, it will be seen that whenever the image scanned is rather large with respect to the diameter of disc 10, the "skew" of the scanning slits, i.e., the angle (alpha) by which a slit 23 can vary from precise parallelism with coincident members of image 24, also becomes large. Under these circumstances a slit such as slit 23*v* will be exactly parallel with the horizontal members of the image 24 only when they occur at the center of the character. For most purposes, this "skewing" does not materially affect the generation of signals from tube 20. However, in attempting to reduce the overall size of a scanner, this "skewing" could conceivably impose an undesirable limitation.

Therefore, to eliminate "skewing" of the scanning slits, an endless belt 40 is provided, as shown in Fig. 4, to carry scanning slits 43 in a straight line across an image 44. Belt 40 is trained around a pair of end rollers 41 and 42. Roller 41 is driven by a motor 46 connected to a common shaft 45. In order for roller 41 to drive belt 40, feed pins 47 are provided around each end thereof. Pins 47 engage holes 48 in the edges of belt 40.

Scanning slits 43*h* and 43*v* are provided in belt 40 disposed at ninety degrees to each other and at forty-five degrees to the direction of belt travel indicated by the arrow thereon. In Fig. 4 the top portion of belt 40 has been cut away for clarity to show the relationship of slits 43 with respect to image 44 of a character projected by suitable means upon the under side of belt 40. Image 44 is projected at forty-five degrees to the direction of belt travel. Thus, one slit 43*h* will be parallel to and hence coincident with the vertical member of the "E" as it passes thereover. This disposition of slit to image will therefore effect a horizontal scan of image 44 along its X axis. Similarly, slit 43*v* effects a vertical scan of image 44 along its Y axis by coinciding with the horizontal members of the "E." Any intermediate axis of image 44 can be scanned by merely providing additional slits, such as slit 43*a*, arranged at suitable angles to the direction of belt travel.

In Figs. 5, 5*a* and 6 is shown another form of the invention employing a drum 50 as the slit carrier. Use of drum 50 to provide scanning eliminates any "skew" as found in disc 10, as did belt 40. In Fig. 5 the number "2" is projected upon the outer circumference of drum 50 so that slits 53*a*, 53*h* and 53*v* will provide scanning along angular, horizontal and vertical axes of the image respectively. For purposes of clarity, Fig. 5*a* shows the drum 50 of Fig. 5 as it would appear if it were "unrolled" and laid flat.

Fig. 6 shows schematically an arrangement for projecting and scanning an image 64 using drum 50. This embodiment comprises a right cylindrical drum 50 tilted at an angle (45°) to a character 65 to be scanned. Drum 50 has slits 53*h* and 53*v* for horizontal (X axis) and vertical (Y axis) scanning respectively. Character 65, masked off by template 68, is projected by lens 62 onto the outer cylindrical surface of drum 50.

As one of slits 53 traverses the field of projection 69, light therefrom passes through drum 50 onto a mirror 67. Mirror 67 does not turn with drum 50 but is attached to a frame member (not shown) and merely extends therefrom into the open end of drum 50. Mirror 67 reflects the light out of drum 50 onto a photomultiplier tube 70. Thus, as with the disc and belt, several apertures scan along different axes of a character while a continuous unidirectional motion is applied to the scanning carrier.

In the embodiments as described above, a separate aperture is used for each character axis to be scanned. However, as shown in Fig. 7, one aperture can be employed for scanning along several axes of a character.

This may be done by projecting the unknown character upon disc 10, for example, simultaneously at several different locations. As shown in Fig. 7, adjacent locations are rotationally displaced forty-five degrees from each other. Therefore, as a slit 73 moves clockwise it first will horizontally scan the "2" as projected onto the underside of disc 10. This is shown at position "H." Next, an angular scan is achieved at position "A." Finally, slit 73 scans the "2" vertically at "V."

Similar results can be achieved with a single aperture using the belt 40 of Fig. 4 and drum 50 of Fig. 6 so long as the several identical images are disposed at various angles to the direction of the aperture path.

While there have been shown and described and pointed out the fundamental novel features of the invention as applied to the preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A scanning device comprising a cyclic carrier, means for applying a continuous motion to said carrier, said carrier having a first and second elongated light transmitting scanning portion formed therein and arranged to travel in a predetermined cyclic path under said applied motion, means for projecting into said path at a predetermined location an image of an alphanumeric character to be scanned, said first portion being disposed at one angle to the direction of travel of said portions through said location so that as said first portion passes through said location it will substantially coincide successively with those parts of said image lying along one axis of said character, said second portion being disposed at a substantially different angle to said direction of travel through said location so that it will substantially coincide successively with those parts of said image lying along another axis of said character as said second portion passes through said location, and means for generating an electrical impulse in response to each said coincidence of one of said portions with a coinciding part of said image to provide a succession of said impulses while scanning along a plurality of axes of said character under said applied motion.

2. The invention according to claim 1 wherein said portions are elongated transparent aperture slits for passing light through said carrier.

3. The invention according to claim 2 wherein said carrier is a rotatable drum.

4. The invention according to claim 2 wherein said carrier is a rotatable disk.

5. The invention according to claim 2 wherein said carrier is an endless belt.

6. A scanning device comprising a cyclic carrier, means for applying a continuous motion to said carrier, said carrier having a single elongated light transmitting scanning slit formed therein and arranged to travel in a predetermined cyclic path under said applied motion, means for projecting into said path at a first and a second location an image of an alphanumeric character to be scanned by said slit, the image at said first location being disposed at one angle with respect to the direction of travel of said slit through said first location so that as said slit passes through said first location said slit will substantially coincide successively with those parts of said image lying along one axis of said character, the image at said second location being disposed at a substantially different angle with respect to said direction of travel of said slit through said second location so that as said slit passes through said second location said slit will substantially coincide successively with those parts of said image lying along another axis of said character, and means for generating an electrical impulse in response to each said coincidence of said slit with a coinciding part of said image at each of said locations to provide a succession of said impulses while scanning along a plurality of axes of said character under said applied motion.

7. The invention according to claim 6 wherein said cyclic carrier is a rotatable disk.

References Cited in the file of this patent

UNITED STATES PATENTS

| | | |
|---|---|---|
| 2,179,243 | Ives | Nov. 7, 1939 |
| 2,228,782 | Sharples | Jan. 14, 1941 |
| 2,287,413 | Bruce et al. | June 23, 1942 |
| 2,432,123 | Potter | Dec. 9, 1947 |
| 2,578,307 | Hunt | Dec. 11, 1951 |
| 2,616,983 | Zworykin et al. | Nov. 4, 1952 |
| 2,659,072 | Coales et al. | Nov. 10, 1953 |
| 2,663,758 | Shepard | Dec. 22, 1953 |
| 2,795,705 | Rabinow | June 11, 1957 |